US009577447B2

(12) United States Patent
Kuk

(10) Patent No.: US 9,577,447 B2
(45) Date of Patent: Feb. 21, 2017

(54) SHORT DISTANCE WIRELESS POWER TRANSMITTING APPARATUS WHICH ENCHANCES WIRELESS POWER TRANSMITTING CAPABILITY REGARDLESS OF A RELATIVE ARRANGMENT WITH RESPECT TO A WIRELESS POWER RECEIVING APPARATUS

(75) Inventor: Yoon-Sang Kuk, Seoul (KR)

(73) Assignee: HANRIM POSTECH CO., LTD., Suwon-si, Gyeonggi-do (KR)

( * ) Notice: Subject to any disclaimer, the term of this patent is extended or adjusted under 35 U.S.C. 154(b) by 531 days.

(21) Appl. No.: 13/701,323

(22) PCT Filed: Jan. 7, 2011

(86) PCT No.: PCT/KR2011/000128
§ 371 (c)(1),
(2), (4) Date: Dec. 5, 2012

(87) PCT Pub. No.: WO2012/074166
PCT Pub. Date: Jun. 7, 2012

(65) Prior Publication Data
US 2013/0069587 A1  Mar. 21, 2013

(30) Foreign Application Priority Data

Nov. 30, 2010 (KR) .......................... 10-2010-0120330

(51) Int. Cl.
*H02J 7/00* (2006.01)
*H02J 5/00* (2016.01)
(Continued)

(52) U.S. Cl.
CPC .............. *H02J 7/0042* (2013.01); *H02J 5/005* (2013.01); *H02J 7/025* (2013.01); *H02J 17/00* (2013.01); *Y02B 60/50* (2013.01)

(58) Field of Classification Search
CPC .......... H02J 5/005; H02J 7/025; H02J 7/0042; H02J 17/00; Y02B 60/50
(Continued)

(56) References Cited

U.S. PATENT DOCUMENTS 7,893,564 B2 * 2/2011 Bennett ................... H02J 17/00
307/104
2005/0189882 A1 * 9/2005 Baarman et al. ............... 315/62
(Continued)

FOREIGN PATENT DOCUMENTS

CN  101425702 A   5/2009
CN  201374229 Y  12/2009
(Continued)

*Primary Examiner* — Yalkew Fantu
*Assistant Examiner* — Manuel Hernandez
(74) *Attorney, Agent, or Firm* — Envision USA Inc.

(57) ABSTRACT

Disclosed herein are a coil resonant coupler for short distance wireless power communication and a short distance wireless power transmitting apparatus comprising the same. The coil resonant coupler for short distance wireless power communication comprises a first coil installed perpendicularly to a first axis; a second coil installed perpendicularly to a second axis perpendicular to the first axis; and a third coil installed perpendicularly to a third axis perpendicular to each of the first and second axes. The short distance wireless power transmitting apparatus comprises a primary side core comprising the above-described coil resonant coupler, a position sensing unit which senses a position of the wireless power receiving apparatus to generate position information, and a transmission controlling unit which controls the primary side core based on the position information.

7 Claims, 2 Drawing Sheets

(51) Int. Cl.
*H02J 7/02* (2016.01)
*H02J 17/00* (2006.01)

(58) Field of Classification Search
USPC .......................................... 320/108
See application file for complete search history.

(56) References Cited

U.S. PATENT DOCUMENTS

2010/0109445 A1* 5/2010 Kurs et al. .................. 307/104
2011/0086256 A1* 4/2011 Julstrom et al. ............. 429/121
2012/0187773 A1* 7/2012 Wechlin et al. ............. 307/104

FOREIGN PATENT DOCUMENTS

| JP | 2009-081946 | 4/2009 |
| KR | 10-2005-0099612 | 3/2005 |
| KR | 10-2005-0105199 | 10/2005 |
| WO | WO 2009/133795 A1 | 11/2009 |

\* cited by examiner

SHORT DISTANCE WIRELESS POWER TRANSMITTING APPARATUS WHICH ENCHANCES WIRELESS POWER TRANSMITTING CAPABILITY REGARDLESS OF A RELATIVE ARRANGMENT WITH RESPECT TO A WIRELESS POWER RECEIVING APPARATUS

CROSS-REFERENCE TO RELATED APPLICATIONS

This application is a national stage of PCT Application No. PCT/KR2011/000128, filed Jan. 7, 2011, which claims the benefit of Korean Application No. 10-2010-0120330, filed Nov. 30, 2010 in the Korean Intellectual Property Office. The disclosures of these applications are incorporated herein by reference.

BACKGROUND OF THE INVENTION

1. Field of the Invention

The present invention relates to a coil resonant coupler for short distance wireless power communication, and a short distance wireless power transmitting apparatus comprising the same.

2. Description of the Related Art

Generally, portable apparatuses such as cellular phones, personal digital assistants (PDAs), portable multimedia players (PMPs), digital multimedia broadcasting (DMB) terminals, MP3 players, or laptop computers may not use general household power, such that the portable apparatuses are mounted with a one-time battery or a rechargeable battery.

In a charger for charging the battery of the portable apparatus with electricity, a terminal supplying scheme of receiving the electricity from a general power supply and supplying power to a battery pack of the battery through a power supplying terminal is known in the related art. However, when the power is supplied in the terminal supplying scheme, if the charger and the battery are connected to or disconnected from each other, the respective terminals may have different potential differences and may generate an instantaneous discharge phenomenon. Therefore, foreign materials which may have collected at the terminals create a risk of a fire. In addition, self-discharge into the environment due to moisture or the like may deteriorate a lifespan and performance of the charger and the battery.

In order to solve these problems in the terminal supplying scheme, a contactless charger has been developed. In the contactless charger according to the related art, when a terminal, in which a battery to be charged is embedded, is positioned on a primary coil of the contactless charger, the battery is charged with electricity by a secondary coil of the battery. That is, the secondary coil charges electricity of an electromotive force induced by a magnetic field generated in the primary coil.

However, the contactless charger according to the related art may charge the battery only if a wireless power receiving apparatus is significantly close to the charger.

In order to solve this problem, short distance wireless power communication systems have been developed. Among these short distance wireless power communication systems, a magnetic resonance type wireless power communication system in which less or more directed electromagnetic waves are generated has been suggested, in order to increase efficiency of power transmission.

SUMMARY OF THE INVENTION

While not limited thereto, an object of the present invention is to provide a coil resonant coupler for short distance wireless power communication capable of improving wireless power transmission efficiency and allowing short distance wireless power communication to be efficiently performed regardless of a direction in which a short distance wireless power receiving apparatus is present with respect to a short distance wireless power transmitting apparatus, in magnetic resonance type short distance wireless power communication, and a short distance wireless power transmitting apparatus comprising the same.

While not limited thereto, according to an embodiment of the present invention, a coil resonant coupler for short distance wireless power communication may comprise a first coil installed perpendicularly to a first axis; a second coil installed perpendicularly to a second axis perpendicular to the first axis; and a third coil installed perpendicularly to a third axis perpendicular to each of the first and second axes.

According to an aspect of the invention, the first to third coils may be annular coils having the same shape.

According to an aspect of the invention, the coil resonant coupler for short distance wireless power communication may further comprise a magnetic focusing plate formed on the same plane as that of the first coil and installed at an inner side of the first coil.

According to an aspect of the invention, the magnetic focusing plate may comprise ferrite.

According to an aspect of the invention, the magnetic focusing plate may have a meta-material structure.

According to aspects of the invention, cross sections of the first to third coils may have a square shape, a circular shape, or an oval shape.

While not limited thereto, according to another embodiment of the invention, a short distance wireless power transmitting apparatus may comprise a primary side core comprising the coil resonant coupler for short distance wireless power communication as described above; a position sensing unit which senses a position of the wireless power receiving apparatus to generate position information; and a transmission controlling unit which controls the primary side core based on a position information received from the position sensing unit.

According to an aspect of the invention, the transmission controlling unit may control a generation of a power signal with respect to at least one of the first to third coils based on the position vector information of the position information.

According to an aspect of the invention, the transmission controlling unit may control a decoupling of at least one of the first to third coils based on the position vector information of the position information.

According to an aspect of the invention, the position sensing unit may generate a pulse signal through one or more of the first to third coils, receive a response signal to the pulse signal through one or more of the first to third coils, and analyze the response signal to generate the position information.

According to an aspect of the invention, the position sensing unit may be an ultrasonic sensor.

An advantage of the embodiment of the present invention having the above-mentioned configuration is that, using the magnetic resonance type short distance wireless power communication, the wireless power may be received even though the wireless power receiving apparatus may be located in any direction relative to the wireless power transmitting apparatus.

An additional advantage of the embodiment of the present invention having the above-mentioned configuration is that, using the magnetic resonance type short distance wireless power communication, the transmission efficiency may be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
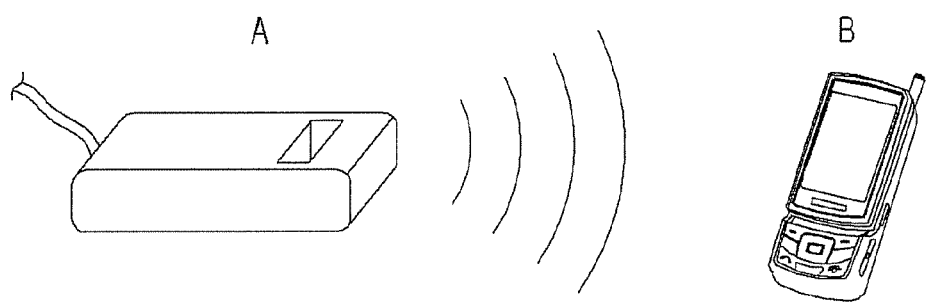
FIG. 1 is a conceptual diagram of a magnetic resonance type wireless power charging system, according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a coil resonant coupler for short distance wireless power communication and a short distance wireless power transmitting apparatus comprising the same according to an exemplary embodiment of the present invention will be described in detail with reference to the accompanying drawings. In the present specification, throughout the exemplary embodiments of the present invention, similar components will be denoted by the same or similar reference numerals and a description thereof will be replaced by a first description.

First, a short distance wireless power communication system will be briefly described with reference to FIG. 1.

FIG. 1 is a conceptual diagram of a magnetic resonance type wireless power charging system according to one embodiment of the present invention. As shown in FIG. 1, the magnetic resonance type wireless power charging system may comprise a wireless power transmitting apparatus A, which is a charger, and a wireless power receiving apparatus B.

Resonance is a phenomenon where, when a vibration system periodically receives external force having the same frequency as a natural frequency thereof, an amplitude thereof is clearly increased. In the case of electrical resonance, the resonance may be caused by electrical vibration as well as dynamical vibration; when a plurality of vibration bodies spaced apart from each other by a predetermined distance vibrate at the same frequency as each other, the plurality of vibration bodies vibrate at a greater amplitude. In such case, resistance between the plurality of vibration bodies is decreased.

A power signal is transmitted to the wireless power receiving apparatus B through a resonance signal by an electric field or a magnetic field generated in a primary side core of the wireless power transmitting apparatus A, using the electrical resonance principle described above, and the wireless power receiving apparatus B receiving the power signal serves as a power supplying unit rectifying the power signal to charge the battery or operate other connected electronic devices.

Hereinafter, a wireless power charging apparatus in the magnetic resonance type wireless power system as described above will be described in detail with reference to FIGS. 2 and 3.

Figure 2:
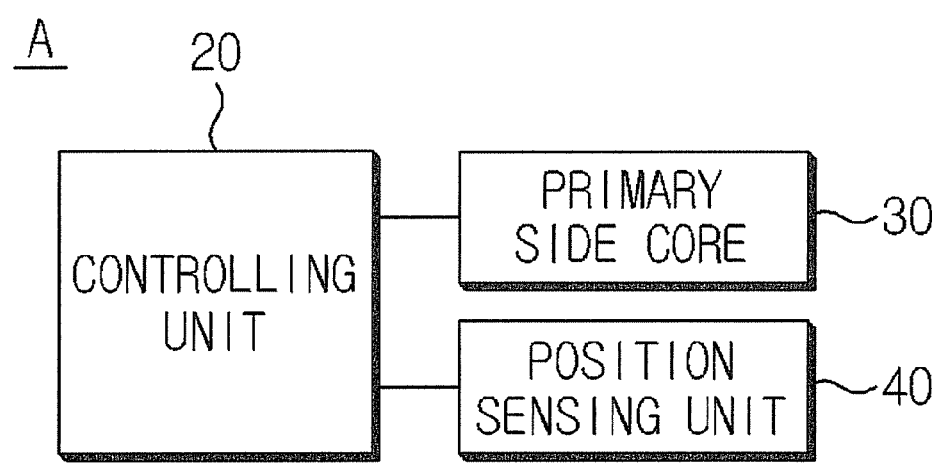
FIG. 2 is a schematic block diagram of a magnetic resonance type wireless power charging apparatus, according to one embodiment of the present invention.

FIG. 2 is a schematic block diagram of a magnetic resonance type wireless power charging apparatus according to one embodiment of the present invention. As shown in FIG. 2, the magnetic resonance type wireless power charging apparatus may be configured to comprise a transmission controlling unit 20, a primary side core 30, and a position sensing unit 40.

The primary side core 30, which generates a resonance signal under a control of the transmission controlling unit 20, may comprise a resonant coupler comprising three coils. The resonant coupler will be described in more detail in FIG. 4.

In the shown embodiment, the position sensing unit 40 is a device sensing a position of the wireless power receiving apparatus B and generating position information reflecting the position. In some embodiments, the position sensing unit 40 may be an ultrasonic sensor and may receive a response signal corresponding to a pulse signal, and may generate the position information using a phase change or a delay time of the response signal when the pulse signal is generated through the resonant coupler. That is, the position sensing unit 40 may generate the pulse signal through one or more of the first to third coils, receive the response signal to the pulse signal through one or more of the first to third coils, and analyze the response signal, thereby generating the position information.

In the shown embodiment, the transmission controlling unit 20 controls the primary side core 30 based on the position information received from the position sensing unit 40. More specifically, the transmission controlling unit 20 control a generation of a power signal with respect to at least one of the first to third coils comprised in the resonant coupler based on position vector information of the position information. That is, when the power signal is generated with respect to at least one of the first to third coils based on the position vector information comprised in the position information, the transmission controlling unit 20 may better control the generation of magnetic resonance by forming a magnetic field in the direction of the wireless power receiving apparatus B. That is, the vector information comprises X axis, Y axis, and Z axis information, and the transmission controlling unit 20 controls a synthesis of magnetic fields, generated in coils (the first to third coils 110 to 130) corresponding to each axis, to form a magnetic field corresponding to the vector information. In some embodiments, the transmission controlling unit 20 may control a decoupling of at least one of the first to third coils based on the position vector information comprised in the position information.

Hereinafter, a configuration of the magnetic resonance type wireless power charging apparatus will be described in more detail with reference to FIG. 3.

Figure 3:
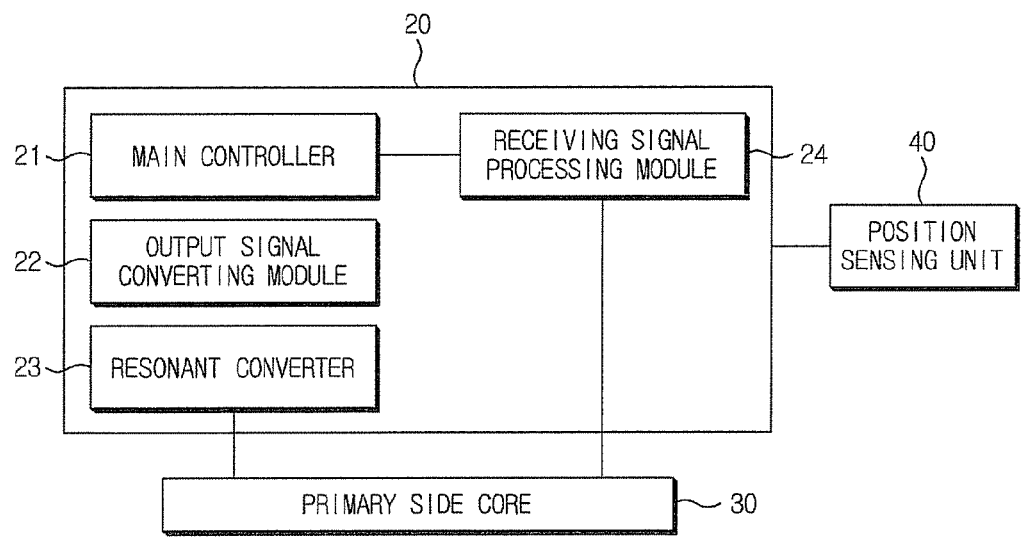
FIG. 3 is a detailed block diagram of the magnetic resonance type wireless power charging apparatus, according to the embodiment of the present invention expressed in FIG. 2.

FIG. 3 is a detailed block diagram of the magnetic resonance type wireless power charging apparatus of FIG. 2.

As shown in FIG. 3, according to one embodiment of the present invention, the transmission controlling unit 20 of the wireless power charging apparatus B may be configured to comprise a main controller 21, an output signal converting module 22, a resonant converter 23, and a receiving signal processing module 24.

In the shown embodiment, the main controller 21 serves to receive and confirm the position information generated in the position sensing unit 40 and control the output signal converting module 22 and the resonant converter 23 in order to transmit the resonant power signal to the primary side core 30. That is, the main controller 21 determines the power signal that is to be transmitted based on a response signal processed in the receiving signal processing module 24 and controls the output signal converting module 22 accordingly, thereby allowing the resonant power signal according to the response signal to be transmitted to the primary side core 30 through the resonant converter.

In the shown embodiment, the output signal converting module 22 serves to control a resonant converter 23, to be described below, based on the control signal of the main controller 21.

In the shown embodiment, the resonant converter 23 generates transmission power for generating the power signal that is to be transmitted under a control of the output signal converting module 22, and supplies the generated transmission power to the primary side core 30. In other words, when the main controller 21 transmits a power control signal for transmitting a power signal having a required power value to the output signal converting module 22, the output signal converting module 22 controls an operation of the resonant converter 23, corresponding to the transmitted power control signal, and the resonant converter 23 applies transmission power corresponding to a required power value to the primary side core 30 by the control of the output signal converting module 22, thereby allowing a resonant wireless power signal having required strength to be transmitted.

In addition, the resonant converter 23 may also, under the control of the output signal converting module 22, supply power initially through the primary side core 30 in order to generate a pulse signal which detects a position of the wireless power receiving apparatus B.

In the shown embodiment, the receiving signal processing module 24 is a module which processes a receiving signal transmitted from the wireless power receiving apparatus B. That is, the receiving signal processing module 24 receives the response signal to the pulse signal, in order to confirm a type of wireless power receiving apparatus B. Then, the receiving signal processing module 24 receives and processes a charged state signal from the wireless power receiving signal during transmission of the resonant wireless power signal. Therefore, the main controller 21 controls the output signal converting module 22 to control the output resonant power signal.

Hereinafter, a structure of a coil resonant coupler used in the primary side core of the magnetic resonance type wireless power charging apparatus having the above-mentioned configuration will be described in detail with reference to FIG. 4.

Figure 4:
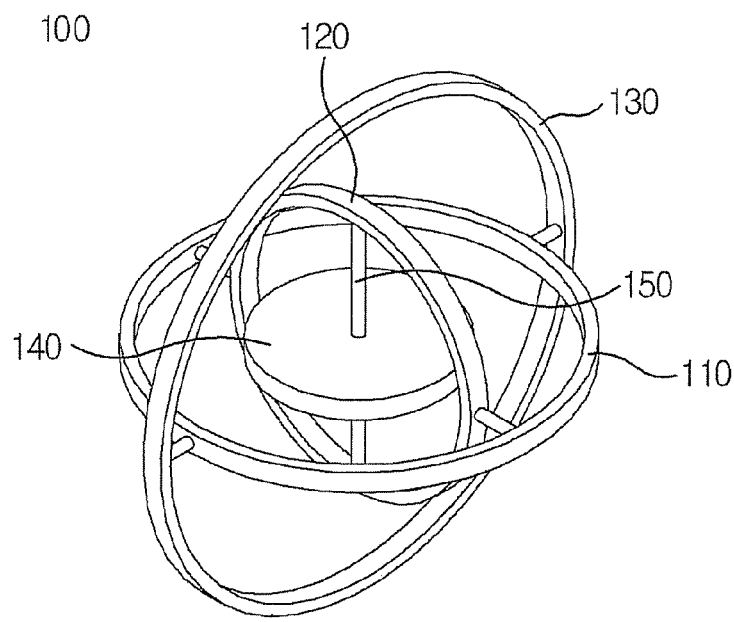
FIG. 4 is a perspective view of a coil resonant coupler forming a primary side core of the magnetic resonance type wireless power charging apparatus according to the embodiment of the present invention expressed in FIG. 2.

FIG. 4 is a perspective view of a coil resonant coupler, which is a primary side core of the magnetic resonance type wireless power charging apparatus of FIG. 2. According to one embodiment of the present invention shown in FIG. 4, the coil resonant coupler may be configured to comprise a first coil 110 installed perpendicularly to a first axis, a second coil 120 installed perpendicularly to a second axis perpendicular to the first axis, a third coil 130 installed perpendicularly to a third axis perpendicular to each of the first and second axes, a disk shaped magnetic focusing plate 140 based on the central axes of these coils, and a fixing bar 150 fixing the magnetic focusing plate 140 to the second coil 120. As shown in FIG. 4, the first to third coils 110 to 130, which are annular coils having the same shape, generate magnetic fluxes in the X axis, the Y axis, and the Z axis, respectively. The resonant power signal is transmitted to the wireless power receiving apparatus B through a synthetic magnetic field of the first to third coils 110 to 130.

In the shown embodiment, the magnetic focusing plate 140, which serves to increase power signal transmission efficiency, may comprise ferrite. The ferrite is a solid solution formed by melting alloy elements or impurities in iron having body-centered cubic crystal stable at a temperature of 900° C. or less. The ferrite, which is a metallographic term for steel, is a solid solution based on a iron, such that it has the same appearance as that of pure iron. However, the ferrite may also be called silicon ferrite or ferrosilicon according to a name of a solved element. When viewed under a microscope, the ferrite has a single crystal. In addition, a mixture of a white portion in which carbon is slightly dissolved and a black portion appears in the ferrite. Since the ferrite has high permeability in a range of a low frequency to several hundreds of MHz, it serves to improve power transmission efficiency in the magnetic resonance type short distance power transmission.

The magnetic focusing plate 140 may have a meta-material structure. The meta-material corresponding to a material having electromagnetic characteristics, which is not present in a general natural state, generated by an artificial method is a material having a negative refractive index. A unique point of the meta-material is that it has a negative refractive index, such the light is refracted in an opposite direction to a direction in which it is refracted in a general material. Since the meta-material has the negative refractive index, it may focus a magnetic field to improve transmission efficiency. As shown in FIG. 4, the magnetic focusing plate 140 may be disposed on the same plate as that of the first coil 110.

The fixing bar 150, which is a component for fixing the magnetic focusing plate 140 to the second coil 120, may be made of a non-conductive material that is not affected by the magnetic field.

In various embodiments, a vertical cross section of the first to third coils 110 to 130 having an annular shape may have a square shape, a circular shape, or an oval shape.

According to the embodiment of the invention having the above-mentioned configuration, using the magnetic resonance type short distance wireless power communication, the wireless power may be received even though the wireless power receiving apparatus B may be located in any direction relative to the wireless power transmitting apparatus A.

In addition, according to the same embodiment of the present invention, using the magnetic resonance type short distance wireless power communication, the transmission efficiency may be improved.

Although a few embodiments of the present invention have been shown and described, the coil resonant coupler for short distance wireless power communication and the short distance wireless power transmitting apparatus comprising the same as described above are not limited to the configurations and the operation schemes of the embodiments described above. It would be appreciated by those skilled in the art that changes may be made in this embodiment without departing from the principles and spirit of the invention, the scope of which is defined in the claims and their equivalents. The above-mentioned embodiments may also variously modified through a selective combination of all or some thereof.

The invention claimed is:

1. A short distance wireless power transmitting apparatus, comprising:
    a primary side core including:
    a first coil installed perpendicularly to a first axis;
    a second coil installed perpendicularly to a second axis perpendicular to the first axis;
    a third coil installed perpendicularly to a third axis perpendicular to each of the first and second axes;
    a magnetic focusing plate formed on a same plane as that of the first coil and installed at an inner side of the first coil to focus a magnetic field for improving transmission efficiency; and
    a fixing bar configured to fix the magnetic focusing plate to the second coil and consisted of a non-conductive material;
    a position sensing unit sensing a 3-D position of the wireless power receiving apparatus to generate 3-D position information of the wireless power receiving apparatus by using a response signal received from the wireless power receiving apparatus; and
    a transmission controlling unit controlling the primary side core based on the 3-D position information received from the position sensing unit.

2. The short distance wireless power transmitting apparatus of claim 1, wherein the transmission controlling unit controls a decoupling of at least one of the first to third coils based on a position vector information of the 3-D position information.

3. The short distance wireless power transmitting apparatus of claim 1, wherein the transmission controlling unit controls a generation of a power signal with respect to at least one of the first to third coils based on a position vector information of the 3-D position information.

4. The short distance wireless power transmitting apparatus of claim 1, wherein the position sensing unit generates a pulse signal through one or more of the first to third coils, receives the response signal to the pulse signal through one or more of the first to third coils, and analyzes the response signal to generate the 3-D position information.

5. The short distance wireless power transmitting apparatus of claim 1, wherein the position sensing unit is an ultrasonic sensor.

6. The short distance wireless power transmitting apparatus of claim 1, wherein the position sensing unit senses the 3-D position by using a phase change of the response signals which are respectively received by the first coil, the second coil and the third coil.

7. The short distance wireless power transmitting apparatus of claim 1, wherein the position sensing unit senses the 3-D position by using a delay time of the response signals which are respectively received by the first coil, the second coil and the third coil.

* * * * *